United States Patent [19]

Tuhy, Jr.

[11] 4,224,476
[45] Sep. 23, 1980

[54] MULTIPARTY SUBSCRIBER LOOP CARRIER SYSTEMS

[75] Inventor: Frank P. Tuhy, Jr., Montville, N.J.

[73] Assignee: Bell Telephone Laboratories, Incorporated, Murray Hill, N.J.

[21] Appl. No.: 974,389

[22] Filed: Dec. 29, 1978

[51] Int. Cl.³ .............................................. H04J 1/14
[52] U.S. Cl. ............................ 179/17 E; 179/17 A; 179/2.51; 179/84 VF
[58] Field of Search ................ 179/17 A, 17 E, 17 R, 179/84 R, 84 VF, 8.5, 2.5 R, 18 FH

[56] References Cited

U.S. PATENT DOCUMENTS

| | | | |
|---|---|---|---|
| 2,763,726 | 9/1956 | Weller | 179/17 E |
| 3,073,905 | 1/1963 | Herrig et al. | 179/17 A |
| 3,649,778 | 3/1972 | Suntop et al. | 179/17 E |
| 3,662,116 | 5/1972 | Wittman | 179/17 E |
| 3,673,330 | 6/1972 | Suntop et al. | 179/2.5 R |
| 3,676,602 | 7/1972 | Goetchius et al. | 179/17 A |
| 4,048,448 | 9/1977 | Canniff et al. | 179/17 E |
| 4,056,684 | 11/1977 | Brolin | 179/84 R |
| 4,056,690 | 11/1977 | Brolin et al. | 179/17 A |

OTHER PUBLICATIONS

"Signaling in P1 Carrier", *Bell Laboratories Record*, pp. 177-181, D. C. Weller and J. C. Donaldson.

*Primary Examiner*—Gerald L. Brigance
*Attorney, Agent, or Firm*—Robert O. Nimtz

[57] ABSTRACT

A subscriber loop carrier system is disclosed in which a plurality of telephone subscriber communications channels are frequency-multiplexed on a single wire pair using analog modulation techniques. Supervisory signaling for each channel is accomplished by modulating the channel carrier with a plurality of tones coded so as to represent a plurality of supervisory functions including multiparty superimposed ringing (four-party fully selective, eight-party semiselective), two-party ringing and tip party identification, and standard single party ringing, as well as off-hook and dial pulse supervision. The system is designed to be universally compatible with any of the above classes of service.

3 Claims, 6 Drawing Figures

REMOTE TERMINAL MODEM

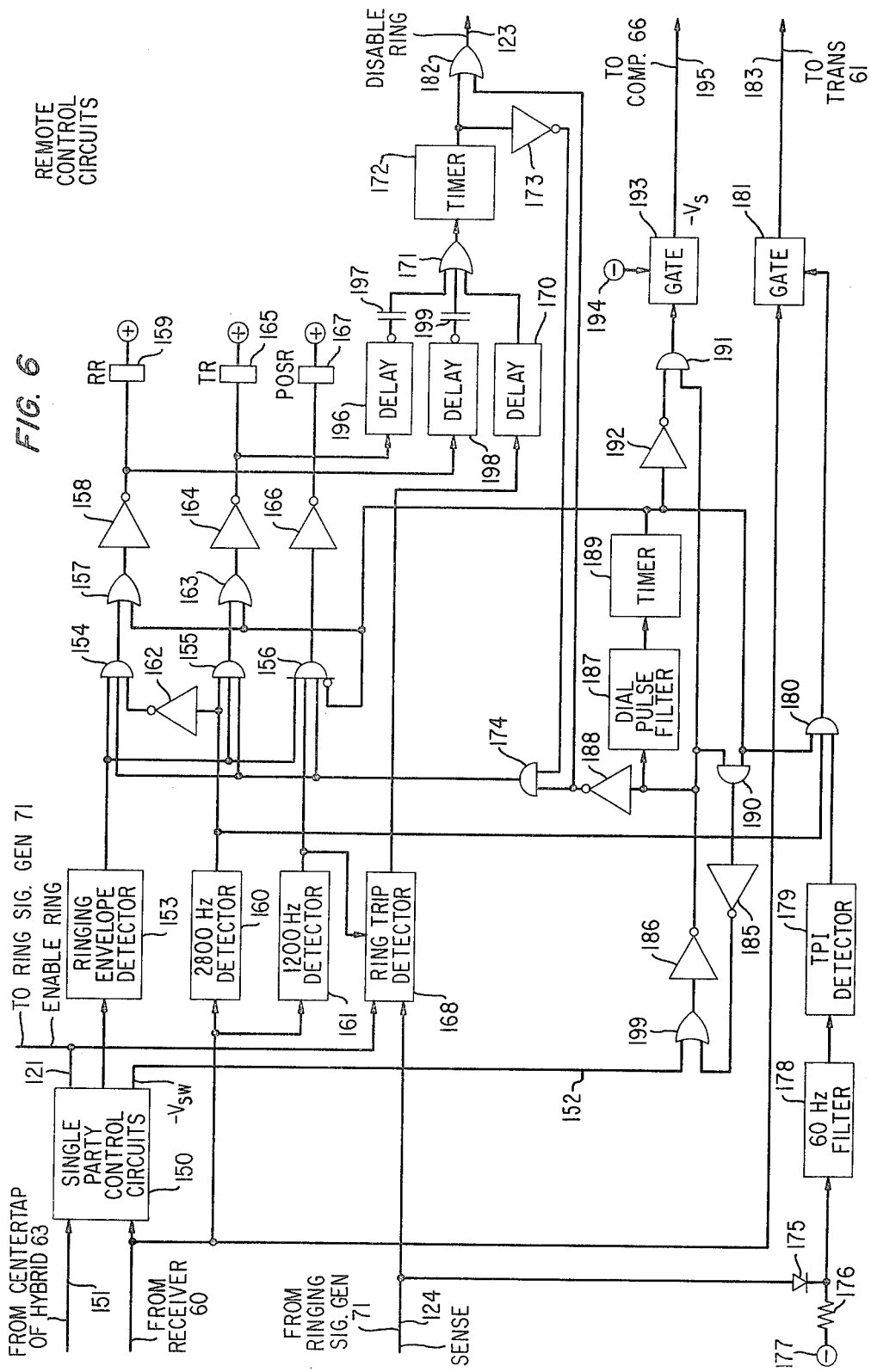

MULTIPARTY SUBSCRIBER LOOP CARRIER SYSTEMS

BACKGROUND OF THE INVENTION

1. Field of the Invention

This invention relates to telephone supervisory signaling and, more particularly, to multiparty ringing control in multichannel subscriber loop carrier systems.

2. Description of the Prior Art

On long rural routes it is often economically attractive to provide a plurality of telephone channels on a single wire pair by using various carrier techniques. Such systems, known as subscriber loop carrier systems, must transmit all of the supervisory signaling required for telephone service as well as the two-way voice channel. It has been customary in prior systems, such as that disclosed in T. N. Rao et al U.S. Pat. No. 4,015,091, granted Mar. 29, 1977, to interrupt the carrier signal in order to transmit the supervisory information. For carrier systems of longer length, however, in which repeaters are necessary, it is usually necessary to maintain the carrier on at all times to control the automatic gain control circuits of the repeaters. Such a system is shown in the copending application of B. S. Bosik, Ser. No. 974,384, filed of even date herewith. In such cases, a single tone can be modulated on the transmitted carrier to encode the supervisory information. While such an arrangement is adequate for a single party service, it cannot be used for multiparty service where a plurality of different ringing states must be transmitted through the carrier system to the remote terminal.

Although many arrangements for encoding multiparty ringing states have been used in the past, these various systems have been incompatible and it was therefore necessary to select the proper signaling modem for a particular class of service and, moreover, to change these modems when a change in class of service occurred. This required the design, manufacture, and stocking of a number of different supervisory signaling modems, thereby increasing the cost and complexity of operating such carrier systems.

SUMMARY OF THE INVENTION

In accordance with the illustrative embodiment of the present invention, a single universally applicable telephone subscriber signaling modem is provided which can be used for all classes of service without modification. Multiparty signaling for ringing is accomplished by utilizing three supervisory tones. The first tone, interrupted at a 20 Hz ringing rate, provides the basic ringing control. Two other supervisory tones are provided, one to indicate tip conductor ringing and the other to indicate positive superimposed ringing. With these three tones it is therefore possible to provide single party tip-to-ring ringing, two-party tip-to-ground or ring-to-ground ringing, four-party fully selective superimposed ringing and eight-party semiselective superimposed ringing. No special selection of the supervisory modem nor of the line is required, since the universal unit responds to all of the standard central office ringing signals with appropriate encodings of the ringing state. In addition, the tones are used to provide tip party identification (TPI) for central offices equipped for two-party automatic number identification (ANI).

BRIEF DESCRIPTION OF THE DRAWINGS

In the drawings:

FIG. 6 is a more detailed block diagram of the remote terminal control circuits used in the remote control modem in FIG. 3.

DETAILED DESCRIPTION

Figure 1:
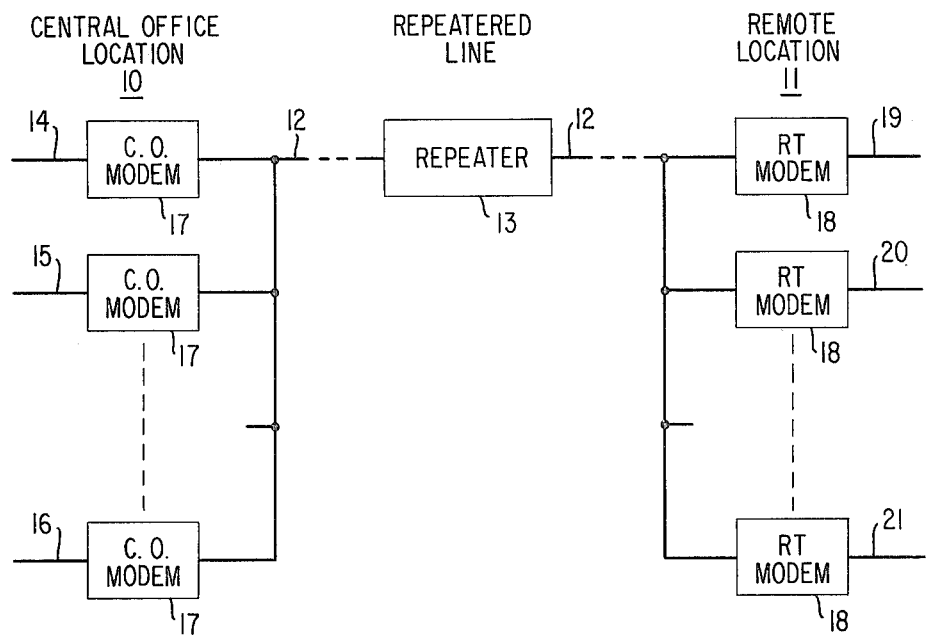
FIG. 1 is a general block diagram of a multichannel subscriber loop carrier system with which the present invention may find use.

In FIG. 1 there is shown a general block diagram of a multicahnnel subscriber loop carrier system in which the multiparty signaling arrangements of the present invention might find use. The carrier system on FIG. 1 includes a central office location 10 and a remote location 11 connected together by a repeatered line 12 including at least one repeater 13. The central office location 10, which is adjacent to the central office switching equipment, provides a plurality of subscriber appearances 14 through 16, each of which is connected to a respective one of central office modems 17. Each of central office modems 17 includes analog carrier facilities for modulating voice signals presented on the central office appearances onto a unique carrier for transmission on repeatered line 12. Central office modems 17 also respond to supervisory signals appearing on central office appearances 14 through 16 and encode these supervisory signals for transmission on the respective carrier signals. The carrier signals from central office modems 17 are transmitted continuously to provide automatic gain control in the repeaters such as repeater 13.

At the remote location 11, the repeatered line 12 is connected to a plurality of remote terminal modems 18, each of which includes complementary carrier facilities for the connected subscriber drops 19 through 21. Remote terminal modems 18 also include the circuits necessary to decode the supervisory signals modulated onto the respective carrier signals and to apply appropriate signaling conditions to the subscriber drops 19 through 21. Modems 17 and 18 together provide for transmission in both directions, preferably providing separate outward bound and inward bound carrier frequency bands for easy separation in bilateral repeater 13.

Supervisory signaling in the direction from remote location 11 to central office 10 is used for line closure supervision. Such line closures indicate off-hook, dial pulsing and ring tripping. These supervisory states can be encoded by interrupting the inward bound carrier signal during the on-hook state, as disclosed in the aforementioned Bosik application. Since gain control in repeater 13 is accomplished entirely in response to the outward bound carrier signals, it is permissible to interrupt the inward bound carrier for signaling purposes.

Outward bound supervisory signaling includes ringing control. Since the carrier signal must be kept on at all times to provide automatic gain control in the repeater 13, outward bound supervisory signaling is accomplished with voice frequency tones modulated onto the carrier signal. In accordance with the present invention, compatible ringing supervision for all classes of service is provided using three supervisory tones. These tones may be at frequencies, for example, of 1200, 2000 and 2800 Hz. The 2000 Hz signal is interrupted at the 20 Hz ringing rate and provides the basic ringing timing for all classes of service. The 1200 Hz tone is utilized to indicate that superimposed ringing on positive direct current voltage is called for. The 2800 Hz tone is used to indicate that the ringing signal is to be supplied between the tip conductor and ground.

It can be seen that basic single party ringing can be provided in response to the 2000 Hz supervisory tone without using the other two supervisory tones. Two-party service is accommodated by using the 2000 Hz tone to control the generation of ringing signals, and the 2800 Hz tone to indicate whether the ringing signal is to be supplied between the tip conductor and ground or the ring conductor and ground. Four-party and eight-party service can be accommodated by utilizing the 2000 Hz and 2800 Hz tones as described above, and by using the 1200 Hz supervisory tone to control the addition of positive or negative superimposed battery to the generated ringing signal. Thus, all classes of service are accommodated with the same ringing arrangements and a single supervisory modem can be used for all classes of service. The service classes are then distinguished only by the ringing signal actually applied at the central office. These ringing signals are detected, encoded and transmitted to the remote terminal to control the duplication of the ringing condition at the remote location 11.

For two-party service with automatic number identification, it is also necessary to detect the presence or absence of the balanced tip-party ground at the subscriber location. This is accomplished at the remote terminal by detecting the longitudinal current in the drop wires and, when present, gating a received ringing control tone to modulate the inward bound carrier. This tone is detected by the central office modem which then applies a balanced ground on the central office subscriber appearance for detection by the standard central office ANI equipment.

Figure 2:
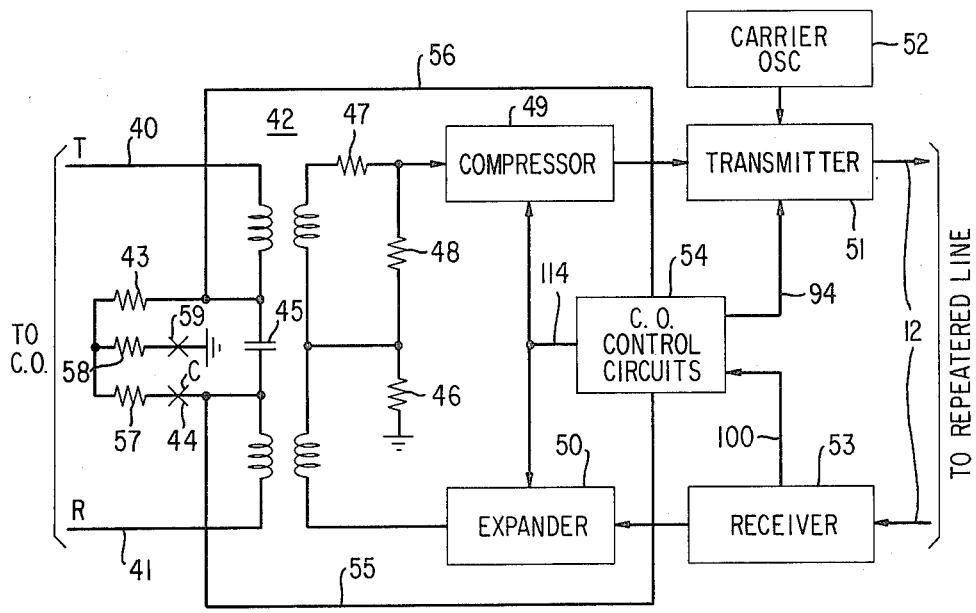
FIG. 2 is a more detailed block diagram of a central office modem useful in the carrier system of FIG. 1.

Referring then to FIG. 2, there is shown a more detailed block diagram of the central office modem 17 of FIG. 1. The central office modem is connected to the central office by means of tip conductor 40 and ring conductor 41 and comprises a hybrid transformer 42 to which conductors 40 and 41 are connected. Resistors 43 and 57 and normally open relay contacts 44 are connected in series with the primary winding of transformer 42. A capacitor 45 is connected in shunt with resistors 43 and 57 and contacts 44 to provide an alternating current signaling path when contacts 44 are open. A resistor 58 and normally open contacts 59 connect the midpoint of resistors 43 and 57 to ground. When operated, contacts 59 provide a longitudinal current to the central office to identify the off-hook party as the tip party on a two-party loop. The secondary side of hybrid transformer 42 has a resistor 46 connected from its center tap to ground as a balancing impedance.

Voltages developed across the voltage divider comprising resistors 47 and 48 are applied to a compressor circuit 49. Compressor 49 compresses the amplitude range of the audio signals supplied to its input so as to minimize distortions in the frequency-derived carrier channels. The compressor 49, as well as the complementary expander 50, may be of the form shown in R. Toumani U.S. Pat. No. 3,919,654, issued Nov. 11, 1975. The output of compressor 49 is applied to a transmitter 51 to which a carrier signal from oscillator 52 is also applied. The audio signals from compressor 49 are amplitude modulated on the carrier frequency from oscillator 52 and launched on transmission facility 12 as shown in FIG. 1.

Amplitude modulated audio signals from the remote terminal arrive on transmission facility 12 and are supplied to a receiver 53 which detects the audio signals and supplies the audio signals to expander 50. Expander 50 restores the full amplitude range of the audio signal and supplies the expanded signal to hybrid transformer 42. These voice signals are then set back through conductors 40 and 41 to the central office facilities.

Central office control circuits 54 provide several control functions for the central office modem of FIG. 2. Control circuits 54, for example, monitor the signal on the central office side of hybrid transformer 42 by way of leads 55 and 56 to detect 20 Hz ringing signals as well as to detect a test voltage applied to these conductors, e.g., a large positive voltage, exceeding and oppositely poled to the normal central office battery supply. This high voltage is normally supplied to metallic subscriber loops in order to perform a continuity test of the loop. Control circuits 54 respond to these central office signals by impressing supervisory tones of preselected frequencies on the carrier signal in transmitter 51. Ringing signals are relayed to the remote terminal by interrupting one of the supervisory tones at a ringing signal rate. The test voltage, on the other hand, is relayed to the remote terminal by turning the same supervisory tone on and leaving it on for a preselected period exceeding the 50-millisecond ringing period.

Figure 3:
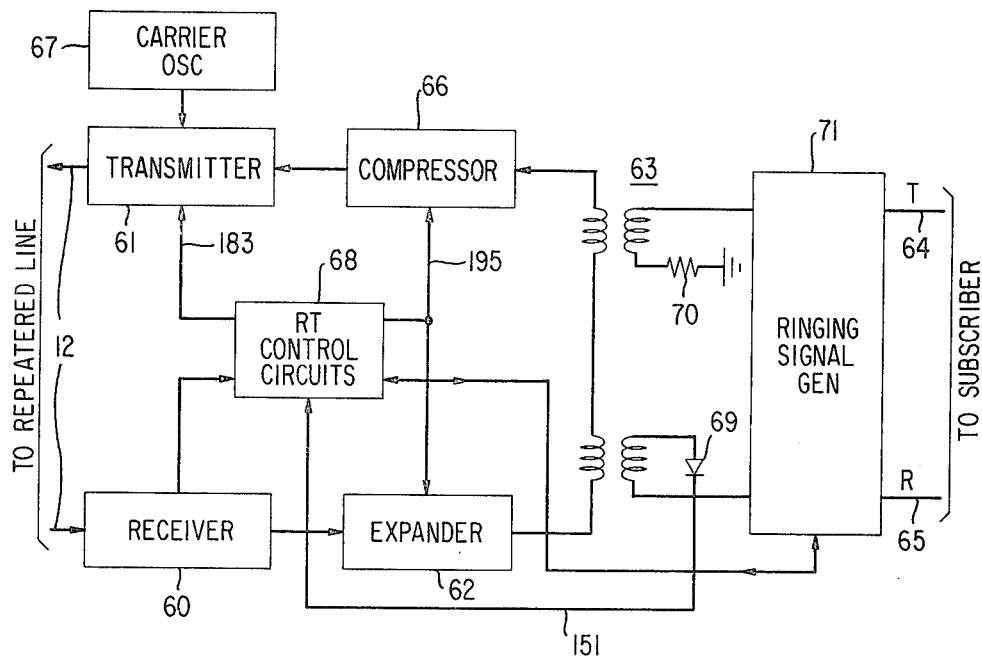
FIG. 3 is a more detailed block diagram of a remote terminal modem useful in the carrier system of FIG. 1.

In FIG. 3 there is shown a more detailed block diagram of the remote terminal modems 18 (FIG. 1) which are connected to transmission facility 12 at a location remote from the central office. Transmission facility 12 is connected to a receiver 60 and a transmitter 61. Receiver 60 responds to signals from transmitter 51 in FIG. 2, detecting the audio signal modulated on the assigned carrier frequency and supplying these audio signals to expander circuit 62. Expander 62 may be identical to expander 50 in FIG. 2 and restores the full amplitude range of the compressed audio signals, supplying these expanded signals to hybrid transformer 63. These audio signals can then be supplied by way of tip conductor 64 and ring conductor 65 to the local telephone subscriber station set.

Audio signals from the subscriber are supplied by way of hybrid transformer 63 to compressor circuit 66 which may be identical to compressor 49 in FIG. 2. Again, compressor 66 compresses the amplitude range of the applied audio signals and supplies this compressed audio signal to transmitter 61. Transmitter 61 modulates the compressed audio signals onto a carrier supplied by carrier oscillator 67 and launches the modulated signal on common transmission facility 12.

Remote terminal control circuit 68 provides the necessary supervisory functions at the remote terminal. First, in response to the supervisory tones modulated on the received carrier and detected by receiver 60, control circuit 68 discriminates between the various ringing signals (one tone interrupted at a 20 Hz rate and the presence or absence of other tones) and a continuity testing signal (the one supervisory tone continuously on). In response to ringing signals, control circuit 68 supplies locally generated ringing signals of the appropriate components from ringing signal generator 71 to the conductors 64 and 65 of the local subscriber drop. In response to the continuity test signal, control circuit 68 enables transmitter 61 to transmit a carrier signal back to the central office location. This transmitted carrier signal can then be detected to indicate the complete continuity of the derived subscriber channel provided by the associated modems.

Control circuit 68 also incudes a line feed circuit for supplying talking current to the local subscriber loop. That is, a negative voltage is supplied through conductor 151, diode 69, ring conductor 65, tip conductor 64 and balancing impedance 70 to ground potential. Control circuit 68 also provides ring trip detection by observing the drop in ringing voltage when the subscriber goes off-hook. This ring trip signal is used to interrupt the locally generated ringing signals and is also used to enable transmitter 61 to transmit a carrier signal back to the central office terminal. This carrier signal, when detected, indicates that ringing signals can be removed from the subscriber appearance.

Control circuit 68 also includes a loop closure detector, responsive to dial pulses and to the subscriber going off-hook in the absence of ringing to likewise enable the transmission of an unmodulated carrier signal for appropriate periods and thereby signal the central office location of the loop closure. As noted in connection with FIG. 2, an unmodulated carrier signal received at the central office modem results in the closure of relay contacts 44 to complete a direct current path between the tip and ring conductors of the central office appearance. Control circuits 68 also control ringing signal generator 71, shown in more detail in FIG. 4. Remote terminal control circuit 68 is more fully described in connection with FIG. 5.

Figure 4:
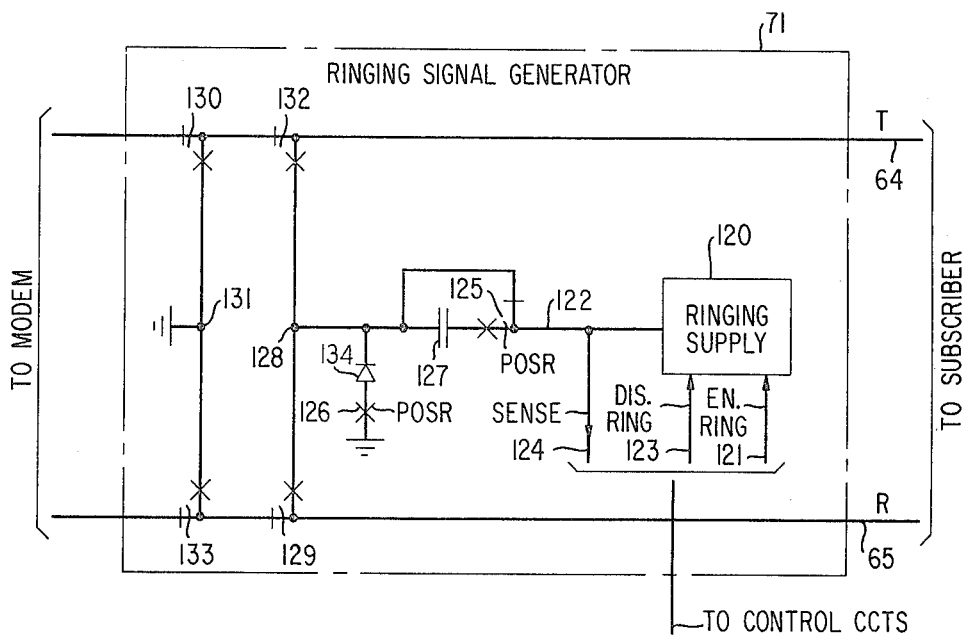
FIG. 4 is a more detailed circuit diagram of the ringing signal generator used in the remote control modem of FIG. 3.

In FIG. 4 there is shown a detailed circuit diagram of the ringing signal generator shown as block 71 in FIG. 3. The ringing signal generator of FIG. 4 includes a ringing supply 120 which may be similar to the ringing supply disclosed in the aforementioned copending application of B. S. Bosik. Ringing supply 120 includes an enable input lead 121 which enables the application of ringing signals to lead 122 when energized. A disable lead 123 serves to disable ringing supply 120 even in the presence of an enable signal on lead 121. In the absence of ringing signals from supply 120, lead 122 becomes a sensing point for balanced longitudinal TPI currents by way of lead 124.

The ringing signals supplied from ringing supply 120 normally vary at a 20 Hz rate between ground potential and a high negative potential. When it is necessary to supply ringing signals with a positive direct current component, POSR contacts 125 and 126 are operated. Under the influence of contacts 125, a clamping capacitor 127 is placed in series with the ringing signal and point 128 is grounded through a diode 134. Capacitor 127 accumulates a sufficient charge to permit the ringing signal to swing from ground potential to a high positive potential and thus applies a ringing superimposed on a positive voltage.

If the ringing signal is to be supplied between the ring conductor 65 and ground potential, RR contacts 129 and 130 are operated to respectively connect point 128 to ring conductor 65 and to connect tip conductor 64 to ground potential at point 131. On the other hand, if the ringing signal is to be supplied between tip conductor 64 and ground potential, TR contacts 132 and 133 are operated to connect tip conductor 64 to point 128 and to connect ring conductor 65 to ground at point 131.

It can thus be seen that the ringing signal generator in FIG. 4 can be used to supply either positive or negative superimposed ringing and the ringing signal can be supplied between either conductor of the subscriber pair and ground potential. The circuit of FIG. 4 can therefore be used to generate ringing signals for any class of service for subscribers connected to conductors 64 and 65.

Figure 5:
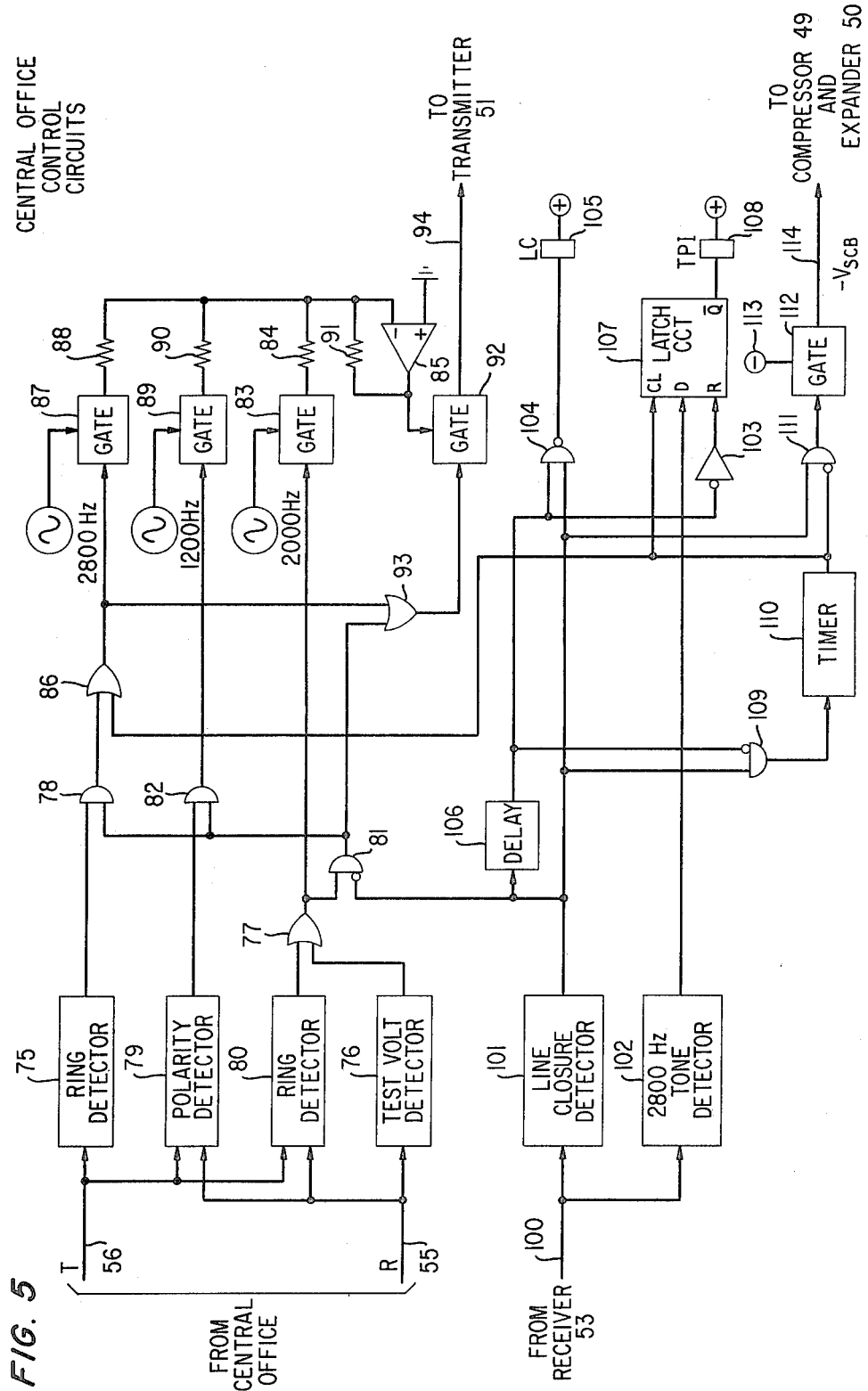
FIG. 5 is a more detailed block diagram of the central office control circuits used in the central office modem of FIG. 2.

In FIG. 5 there is shown a detailed partial schematic and partial block diagram of the central office control circuits shown as element 54 in FIG. 2. The control circuits of FIG. 5 are connected to the control leads 55 and 56 which are connected through the windings of transformer 42 to central office appearances 41 and 40 as shown in FIG. 2. Lead 55 is connected to a 20 Hz ringing signal detector 80 and a test voltage detector 76. Ringing detector 80 detects 20 cycle ringing signals appearing on lead 55 or 56 and, in response thereto, provides an output to one input of OR gate 77, the output of which is supplied to inhibited AND gate 81. Test voltage detector 76 detects a direct current voltage on lead 55 which is opposite in polarity to and substantially higher in magnitude than the normal office battery voltage from the central office and supplies this indication to the other input of OR gate 77. The detailed circuits for implementing detectors 80 and 76 are disclosed in the copending application of B. S. Bosik, Ser. No. 974,384, filed of even date herewith.

Leads 55 and 56 are also connected to a polarity detector 79 which detects the polarity of any direct current voltage existing between lead 55 or lead 56 and ground. Lead 56 is also connected to ringing detector 75 and ringing detector 80. Ringing detector 75 may be identical to ring detector 80 and supplies an output to AND gate 78. The output of polarity detector 79 is applied to one input of AND gate 82. The remaining inputs to AND gates 78 and 82 are supplied from the output of inhibited AND gate 81.

OR gate 77, when enabled by either ringing signals on leads 55 or 56 or a test voltage on lead 55, enables a tone gate 83 which connects a 2000 Hz source through resistor 84 to a summing amplifier 85. The output of AND gate 78, indicating that ringing signals have been detected on lead 56, enables OR gate 86, the output of which operates tone gate 87. Tone gate 87 connects a 2800 Hz tone supply through resistor 88 to summing amplifier 85. AND gate 82, which is enabled by polarity detector 79 when a ringing signal superimposed on a positive dc voltage is present on lead 55 or lead 56, enables a tone gate 89. Tone gate 89 connects a 1200 Hz tone source through resistor 90 to summing amplifier 85. Summing amplifier 85 is an operational amplifier having one input connected to ground and having a feedback resistor 91 connected from its output to the remaining input. The output of amplifier 85 is applied to combined tone gate 92 under the control of signals from OR gate 93. The outputs of gates 81 and 86 are combined in OR gate 93 to enable gate 92. The output of gate 92 is applied by way of lead 94 to the transmitter 51 of FIG. 2 to be modulated onto the carrier signal from oscillator 52 and then transmitted to the remote terminal.

The output from receiver 53 of FIG. 2 is supplied by way of lead 100 to a line closure detector 101 and a 2800

Hz detector 102. It will be recalled that a line closure at the remote terminal subscriber location is indicated by the presence of a carrier signal in the corresponding subscriber channel. This carrier signal is detected by a line closure detector 101 and applied to the inhibit input of gate 81. In this way, the generation of ringing signals is prevented in the presence of an off-hook indication from the remote subscriber.

The output of detector 101 is also applied through an inverting AND gate 104 to operate line closure (LC) relay 105. The line closure relay operates contacts 44 in FIG. 2 to provide an indication of line closure to the central office. The output of detector 101 is also applied to a 200-millisecond delay circuit 106, the output of which is applied to the remaining input of inverting AND gate 104. Thus, a line closure condition must exist for a period of time exceeding 200 milliseconds before relay 105 is operated. In this way, relay 105 is not operated until the tip party identification test circuiit have had sufficient time to operate TPI relay 108 if a tip party ground was detected by the RT modem 18.

The presence of a 2800 Hz tone on the returned carrier indicates that the tip party in a two-party circuit is the active party. This signal is detected by tone detector 102 and applied to the data input of latch circuit 107. The inverted output of latch circuit 107 operates tip party identification relay 108. When operated, TPI relay 108 closes TPI contacts 59 in FIG. 2 to provide a longitudinal ground signal to the central office. In this way, the central office can observe the balanced line connection to ground which, in accordance with standard telephone practice, identifies the calling party as the tip-connected party in the two-party ANI system.

The reset input to latch circuit 107 is derived from the inverted output of delay circuit 106 via inverter 103. This prevents TPI relay 108 from operating until a line closure has been indicated for at least 200 milliseconds and clears the latch output 200 milliseconds after line closure is removed. The clock input to latch 107 is taken from timer 110. Data can only set latch 107 during the 300-millisecond ON period of timer 110, thus insuring that speech or noise will not cause a false operation of the TPI relay 108.

The output of line closure detector 101 and delay circuit 106 are also applied to inhibited AND gate 109, the output from delay circuit 106 being applied to the inhibit input. Thus, gate 109 is enabled only during the first 200 milliseconds of a line closure condition. The output of gate 109 initiates a timing cycle in a timer circuit 110 which times for a 300-millisecond ON period. The output of timer 110 is applied to the inhibit input of inhibited AND gate 111. The other input to AND gate 111 is taken from the output of line closure detector 101. It can thus be seen that if a line closure occurs and persists for more than 300 milliseconds, gate 111 will become fully enabled to operate gate 112. Gate 112 connects a negative supply voltage 113 to lead 114 to enable the compressor 49 and the expander 50 of FIG. 2. Thus, after a 300-millisecond delay, the voice path in the subscriber channel becomes enabled. This delay permits the tip party identification process to be completed before the talking path is enabled.

The tone gating circuits of FIG. 5 implement the signaling arrangements described in connection with FIG. 1. That is, basic ringing information is transmitted by operating tone gate 83 at a 20 Hz rate. For single party service this is the only signal that need be transmitted to the remote terminal to control ringing. Two-party service is accommodated by operating gate 87 to provide a 2800 Hz signal superimposed on the interrupted 2000 Hz signal. The 2800 Hz signal indicates tip-side ringing and thus its presence or absence identifies which party of the two-party circuit is to be rung. The remote terminal, of course, responds by applying ringing signals between the appropriate one of the conductors and ground potential as described in connection with FIG. 4.

For four-party fully selective ringing, gate 89 is enabled to provide a 1200 Hz signal superimposed on the interrupted 2000 Hz signal. This is used to indicate a positive superimposed ringing signal. The interrupted 2000 Hz signal, along with the absence or presence of the 2800 Hz signal indicates that superimposed ringing is to be applied to the ringing or tip conductor, respectively, with a polarity dictated, again, by the presence or absence of the 1200 Hz signal. Eight-party semiselective ringing is accommodated in the same fashion as the four-party ringing except that the pattern of 20 Hz ringing bursts is varied in the same manner as the signal supplied by way of leads 55 and 56 from the central office.

It can thus be seen that the control circuits shown in FIG. 5 detect ringing signals supplied by the central office for all classes of residential subscriber service. The ringing information is encoded onto three tones modulated on the outbound carrier signal, which tones can be detected at the remote terminal and used to control the application of remotely generated ringing signals to the subscriber loop. Using this arrangement, it is unnecessary for the central office to provide special accommodations for the carrier channel and, indeed, the central office need not be aware of whether the subscriber is being served over a metallic loop or over a carrier-derived channel.

In FIG. 6 there is shown a detailed block diagram of the remote terminal control circuits shown as block 68 in FIG. 3. The control circuits of FIG. 6 comprise a single party control circuit 150 which may be identical to the remote terminal control circuits shown in the aforementioned copending Bosik application. In general, these circuits detect the presence of the 2000 Hz supervisory tone from the receiver 60 in FIG. 3 and utilize the supervisory tone to control the generation of ringing signals by way of lead 121. Control circuits 150 also include circuits for detecting loop closure in the subscriber drop by way of lead 151 as well as supplying talking current to the local loop. Finally, control circuits 150 detect a continuous 2000 Hz tone which indicates a continuity test signal. In response to such a test signal or to loop closure, an output signal is provided on lead 152 which, as will be discussed hereafter, enables the inward bound return carrier to signal these conditions to the central office terminal. The envelope of the 2000 Hz signal is also supplied to ringing envelope detector 153 which detects the two-seconds on, four-seconds off envelope of the ringing signal and applies this as a control signal to AND gates 154, 155 and 156. This signal is the basic ringing control signal and is utilized for all classes of service. Thus, the output of AND gate 154 is supplied through OR gate 157 and inverter 158 to operate RR relay 159. As discussed in connection with FIG. 4, contacts on RR relay 159 connect the ringing signal between the ring conductor and ground. For single party service this is the only received signal and thus supplies a standard single party ringing signal.

The output from receiver 60 is also connected to a 2800 Hz detector 160 and a 1200 Hz detector 161. The output of detector 160 is applied to AND gate 155 and, by way of inverter 162, to one input of AND gate 154. The output of AND gate 155 is applied through OR gate 163 and inverter 164 to operate TR relay 165. As discussed in connection with FIG. 4, TR relay 165 operates TR contacts 132 and 133 to connect the ringing signal between the tip conductor and ground. Inverter 162 prevents the simultaneous operation of relays 159 and 165.

The output of detector 161 is supplied to AND gate 156, the output of which is supplied through inverter 166 to operate POSR relay 167. As noted in connection with FIG. 4, POSR relay 167 operates contacts 125 and 126 which provide positive superimposed ringing as opposed to the negative superimposed ringing normally supplied from the ringing supply 120.

The sense lead 124 from FIG. 4 is applied to ring trip detector 168 which is enabled only during the presence of a ringing signal on lead 121. Ring trip detector 168 has an input from the 1200 Hz detector 161 which changes the ring trip threshold during positive superimposed ringing. When the connected subscriber goes off-hook, ring trip detector 168 detects the drop in line voltage and, in response thereto, disables ringing. This is accomplished through a delay circuit 170 and OR gate 171 to operate timer 172. The output of timer 172 is applied through OR gate 182 to lead 123 as shown in FIG. 4, to disable the ringing supply and thus terminate ringing. This ringing termination signal is also applied through inverter 173 and AND gate 174 to disable gates 154, 155 and 156, thereby releasing relays 159, 165 and 167.

Lead 124 is also connected through diode 175 and resistor 176 to negative voltage source 177. In the absence of ringing signals, the longitudinal current on sense lead 124 can be used to identify the tip party in a two-party loop. Due to the ground connection at the ringer of the tip party, a longitudinal current is permitted to flow in the loop in response to the negative voltage 177 through resistor 176. This longitudinal current appears as a voltage across resistor 176 and is applied through a 60 Hz filter 178 (to remove induced 60-cycle currents) to a tip party identification detector 179. Detector 179 responds to the longitudinal direct current by providing an output to AND gate 180. Another input to AND gate 180 is taken from the output of 2800 Hz detector 160, indicating that the central office modem is performing a TPI test. The remaining input to gate 180, indicating an off-hook condition, as will be described hereafter, fully enables AND gate 180 to apply an enable signal to gate 181. Gate 181, when enabled, connects the received tone signals from receiver 60 to lead 183. This tone is applied to the transmitter 61 of FIG. 3 to modulate the carrier signal and thereby transmit the 2800 Hz signal back to the central office terminal. As discussed in connection with FIG. 5, the 2800 Hz signal is utilized at the central office terminal to operate a tip party identification relay (TPI relay 108) which relays the tip party identification to the central office appearance by closing contacts 59.

The output of control circuits 150 on lead 152 provides a negative supply when a subscriber is off-hook, and is applied through OR gate 199 and inverter 186 to dial pulse filter 187. The output of inverter 186 is also applied through inverter 188 and AND gate 174 to disable AND gates 154, 155 and 156, and through OR gate 182 to lead 123. In this way, ringing is prevented when the local subscriber is off-hook or when a continuity test or a TPI test is in progress.

The output of dial pulse filter 187 is applied to a timer circuit 189. Timer 189 provides a timed output for tip party identification testing purposes. To this end, the output of timer 189 inhibits AND gate 156 to disable POSR relay 167 and, by way of OR gates 157 and 163, operates RR relay 159 and TR relay 165. As can be seen in FIG. 4, this connects the sense lead 124 to the tip conductor 64 and ring conductor 65 in parallel, thereby providing the necessary circuit for detecting longitudinal currents by way of detector 179. The output of timer 189 is also connected to the remaining input to AND gate 180 and to AND gate 190. The other input to AND gate 190, taken from the output of inverter 186, completes the enablement of AND gate 190, the output of which is applied through inverter 185 to OR gate 199. Thus, an input to inverter 186 is maintained during the tip party identification test period.

An AND gate 191 receives one input from inverter 186, indicating an off-hook condition, and another input via inverter 192 from the output of timer 189. This latter signal therefore indicates that a tip party identification test is not in progress. The output of AND gate 191 is used to operate gate 193 to connect negative supply voltage 194 to lead 195. The signal on lead 195 is a supply signal for compressor 66 in FIG. 3 and thus serves to enable the talking path following the termination of the tip party identification test period or immediately for other classes of service.

The output of inverter 158 is connected through an inverting delay circuit 198 and a capacitor 199 to OR gate 171. Similarly, the output of inverter 164 is connected through inverting delay circuit 196 and capacitor 197 to OR gate 171. Due to the presence of capacitors 197 and 199, OR gate 171 is enabled only during the release transients of relays 159 and 165. As previously noted, OR gate 171 initiates a timing cycle in timer 172 to disable ringing signals for a brief period. This arrangement insures that ringing signals are not applied to lead 122 in FIG. 4 during a change in ringing states until the timing cycle is finished in timer 172. This prevents erroneous ringing states from appearing on leads 64 and 65 in FIG. 3 due to detector settling times during a change in ringing states and also avoids arcing and pitting of the relay contacts. This blockage of ringing during relays operations is particularly important for revertive ringing, especially on the opposite conductor of the same pair, to prevent bell taps at other subscriber locations.

It can be seen that the supervisory control circuits of the present invention provide compatable ringing by all classes of residential subscriber service. This permits the use of the control circuits of the present invention regardless of the class of service of the subscribers utilizing the channel. It is therefore not necessary to keep separate signaling modems for each class of service on hand and select the proper modem for the class of service actually in use. This reduces the cost of installing and maintaining carrier-derived subscriber channels.

I claim:

1. A multiparty signaling system for a telephone subscriber loop frequency multiplexed carrier system including a unique carrier frequency signal source for each subscriber channel, said signaling system characterized by means for intermittently modulating a first signaling tone on said unique carrier frequency signal in accordance with ringing frequency signal components on a first conductor, means for modulating a second signaling tone on said unique carrier frequency signal in response to ringing signals on a second conductor, means for modulating a third signaling tone on said unique carrier frequency signal in response to a particular polarity of the direct current voltage between said first and second conductors, means at the remote end of said carrier system for providing superimposed ringing signals in response to the detection of said first, second and third signaling tones, means at said remote end for detecting balanced longitudinal currents, and means responsive to said detecting means for returning said signaling tones to the other end of said carrier system.

2. The multiparty signaling system according to claim 1 further characterized by means at a central office for continuously modulating said first signaling tone on said unique carrier frequency signal in response to a test voltage of a larger magnitude than said direct current voltage between said first and second conductors, and means at the remote terminal for returning said unique carrier to said central office.

3. A multiparty ringing system for carrier-derived telephone subscriber loops characterized by a source of three supervisory tones, means utilizing a first one of said tones for providing single party ringing supervision, means utilizing two of said tones for providing two-party ringing supervision, means utilizing all three of said tones for providing four-party fully selective and eight-party semiselective ringing supervision, means at the remote end of said carrier-derived telephone subscriber loop for detecting a balanced ground connection, and means responsive to said detecting means for returning one of said signaling tones from said remote end.

* * * * *

UNITED STATES PATENT AND TRADEMARK OFFICE
CERTIFICATE OF CORRECTION

PATENT NO. : 4,224,476

DATED : September 23, 1980

INVENTOR(S) : Frank P. Tuhy, Jr.

It is certified that error appears in the above-identified patent and that said Letters Patent are hereby corrected as shown below:

In the Abstract, line 11, "superivision" should read --supervision--. Column 2, line 22, "multicahnnel" should read --multichannel--. Column 7, line 19, "circuiit" should read --circuits--. Column 11, line 19, after "means" and before "for" the following should be inserted --and the reception at said remote end of one of said signalling tones--. Column 12, line 7, after "carrier" insert --frequency signal--; line 21, after "means" and before "for" the following should be inserted --and the reception at said remote end of one of said signalling tones--.

Signed and Sealed this

Twenty-fourth Day of March 1981

[SEAL]

*Attest:*

RENE D. TEGTMEYER

*Attesting Officer*     *Acting Commissioner of Patents and Trademarks*